(12) United States Patent
Jun

(10) Patent No.: US 11,272,085 B2
(45) Date of Patent: Mar. 8, 2022

(54) CAMERA MODULE AND PORTABLE ELECTRONIC DEVICE

(71) Applicant: Samsung Electro-Mechanics Co., Ltd., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 259 days.

(21) Appl. No.: 16/375,940

(22) Filed: Apr. 5, 2019

(65) Prior Publication Data

US 2020/0028999 A1    Jan. 23, 2020

(30) Foreign Application Priority Data

Jul. 20, 2018  (KR) .................. 10-2018-0084859

(51) Int. Cl.
| | | |
|---|---|---|
| *H04N 5/225* | (2006.01) | |
| *G06F 1/16* | (2006.01) | |
| *G02B 27/09* | (2006.01) | |
| *G02B 7/10* | (2021.01) | |

(52) U.S. Cl.
CPC ........... *H04N 5/2254* (2013.01); *G02B 7/102* (2013.01); *G02B 27/0977* (2013.01); *G06F 1/1686* (2013.01); *H04N 5/2252* (2013.01)

(58) Field of Classification Search
CPC .. H04N 5/2254; H04N 5/2252; H04N 5/2257; G06F 1/1686; G02B 27/0977; G02B 7/102; G02B 13/0065; G02B 27/646; G02B 13/004; G02B 7/09; G02B 7/023; G02B 7/04; H04M 1/0264; G03B 17/12; G03B 13/34; G03B 5/00; G03B 17/02; G03B 2205/0046
See application file for complete search history.

(56) References Cited

U.S. PATENT DOCUMENTS

| | | |
|---|---|---|
| 10,310,290 B2 | 6/2019 | Yu et al. |
| 2005/0174657 A1 | 8/2005 | Honsho |
| 2007/0127139 A1* | 6/2007 | Funahashi ............ G02B 15/145 359/696 |
| 2008/0055743 A1 | 3/2008 | Sato |
| 2014/0009631 A1 | 1/2014 | Topliss |

(Continued)

FOREIGN PATENT DOCUMENTS

| | | |
|---|---|---|
| CN | 200969608 Y | 10/2007 |
| CN | 101135765 A | 3/2008 |

(Continued)

OTHER PUBLICATIONS

Korean Office Action dated Jan. 14, 2020 in counterpart Korean Patent Application No. 10-2018-0084859 (8 pages in English and 6 pages in Korean).

(Continued)

*Primary Examiner* — Mekonnen D Dagnew
(74) *Attorney, Agent, or Firm* — NSIP Law

(57) ABSTRACT

A camera module includes a carrier accommodating lenses, a housing accommodating the carrier, a first driving part configured to move the carrier in an optical axis direction, and a second driving part configured to move at least one lens of the lenses relative to the carrier in the optical axis direction.

20 Claims, 9 Drawing Sheets

(56) References Cited

U.S. PATENT DOCUMENTS

| | | | | |
|---|---|---|---|---|
| 2015/0135703 A1* | 5/2015 | Eddington | ......... | H04N 5/23287 60/528 |
| 2015/0215541 A1 | 7/2015 | Nomura et al. | | |
| 2017/0108705 A1* | 4/2017 | Yu | ........................ | G02B 13/009 |
| 2018/0109660 A1 | 4/2018 | Yoon et al. | | |
| 2020/0310224 A1* | 10/2020 | Fang | ....................... | F03G 7/065 |

FOREIGN PATENT DOCUMENTS

| | | |
|---|---|---|
| CN | 102385131 A | 3/2012 |
| CN | 103163619 A | 6/2013 |
| CN | 108141518 A | 6/2018 |
| JP | 2007-47468 A | 2/2007 |
| JP | 2011-81426 A | 4/2011 |
| KR | 10-2015-0091010 A | 8/2015 |
| KR | 10-2016-0042066 A | 4/2016 |
| KR | 10-2018-0012150 A | 2/2018 |
| KR | 10-2018-0041040 A | 4/2018 |
| WO | WO 2015/021279 A1 | 2/2015 |

OTHER PUBLICATIONS

Chinese Office Action dated Jan. 6, 2021 in counterpart Chinese Patent Application No. 201910455161.2 (8 pages in English and 9 pages in Chinese).

Chinese Office Action dated Sep. 9, 2021, in counterpart Chinese Patent Application No. 201910455161.2 (5 pages in English and 6 pages in Chinese).

\* cited by examiner

CAMERA MODULE AND PORTABLE ELECTRONIC DEVICE

CROSS-REFERENCE TO RELATED APPLICATIONS

This application claims the benefit under 35 U.S.C. 119(a) of Korean Patent Application No. 10-2018-0084859 filed on Jul. 20, 2018, in the Korean Intellectual Property Office, the entire disclosure of which is incorporated herein by reference for all purposes.

BACKGROUND

1. Field

This application relates to a camera module and portable electronic device.

2. Description of the Background

Recently, camera modules have been basically employed in portable electronic devices such as smartphones, tablet PCs, laptop computers, and the like, and recently an auto-focusing (AF) function and an optical image stabilization (OIS) function have been added to camera modules.

A zooming function, magnifying a subject at a long distance and capturing an image of the magnified subject, includes an optical zooming method and a digital zooming method.

According to the optical zooming method, a focal length is changed by moving a lens of a camera module to magnify a subject and capture an image of the magnified subject. When an image is captured, the quality of the captured image is not deteriorated. However, since the focal length can be changed by moving the lens of the camera module, a size of the camera module is increased in an optical axis direction.

According to the digital zooming method, a portion of data of a captured image is digitally processed to magnify the captured image. A zooming effect may be obtained, but image quality may be deteriorated.

For example, the optical zooming method may obtain an image having better image quality than the digital zooming method. However, since a portable electronic device is small in size, it may be difficult to implement an optical zooming function in a camera module mounted in the portable electronic device.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a carrier accommodating lenses, a housing accommodating the carrier, a first driving part configured to move the carrier in an optical axis direction, and a second driving part configured to move at least one lens of the lenses relative to the carrier in the optical axis direction.

The first driving part may include a first magnet disposed on the carrier, and a first coil disposed to face the first magnet.

The second driving part may include a guide member disposed between the lenses and the carrier, a second magnet disposed on the guide member, and a second coil disposed to face the second magnet.

The guide member and the at least one lens may be moved in different directions by driving force generated by the second magnet and the second coil.

The second magnet and the second coil may react to each other to generate driving force in a direction perpendicular to the optical axis direction.

The guide member may be moved in a direction perpendicular to the optical axis direction by the driving force, and the at least one lens may be moved in the optical axis direction according to movement of the guide member.

The carrier may include a mounting hole exposing a portion of the guide member, and the second magnet may be disposed on the exposed portion of the guide member.

The camera module may further include a lens barrel accommodating the at least one lens, the lens barrel may include a protrusion, the guide member may include a guide hole through which the protrusion penetrates, and the carrier may include a guide groove in which the protrusion is disposed.

The guide hole may have a shape inclined to the optical axis direction.

The guide groove may have a shape extending in the optical axis direction.

The at least one lens may be moved relative to the carrier by the second driving part, and at least one other lens of the lenses may be fixed to the carrier.

The camera module may further include a reflection member, disposed in front of the lenses, changing a path of light.

A portable electronic device may include the camera module further including a sensor part disposed in the housing, configured to convert light incident through the lenses to an electric signal, and the portable electronic device may include a display unit disposed on a surface of the portable electronic device to display an image based on the electric signal.

In another general aspect, a camera module includes a carrier accommodating lens parts, a reflection member disposed in front of the lens parts, changing a path of light, a housing accommodating the carrier, a first driving part configured to move the carrier in an optical axis direction, and a second driving part configured to move at least one lens part of the lens parts in the optical axis direction relative to another lens part of the lens parts.

The second driving part may include a guide member disposed between the lens parts and the carrier, a magnet mounted on the guide member, and a coil disposed to face the magnet.

The guide member may be moved in a direction perpendicular to the optical axis direction by the magnet and the coil, and the at least one lens part may be configured to be moved in the optical axis direction according to movement of the guide member.

The other lens part may be fixed to the carrier.

The other lens part may include a fixed lens part fixed to the carrier and a movable lens part, wherein the movable lens part is moved relative to the fixed lens part when the second driving part moves the at least one lens part.

A portable electronic device may include the camera module further including a sensor part disposed in the housing, configured to convert light incident through the lens parts to an electric signal, and a display unit disposed on a surface of the portable electronic device to display an image based on the electric signal.

In another general aspect, a camera module includes a carrier accommodating lens parts disposed along an optical axis, the carrier including slots inclined to the optical axis movable in a direction substantially perpendicular to the optical axis, wherein a first portion of the lens parts is fixed to the carrier and a second portion of the lens parts is slidably disposed in the slots to move in the optical axis direction relative to the first portion when the slots move in the direction substantially perpendicular to the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
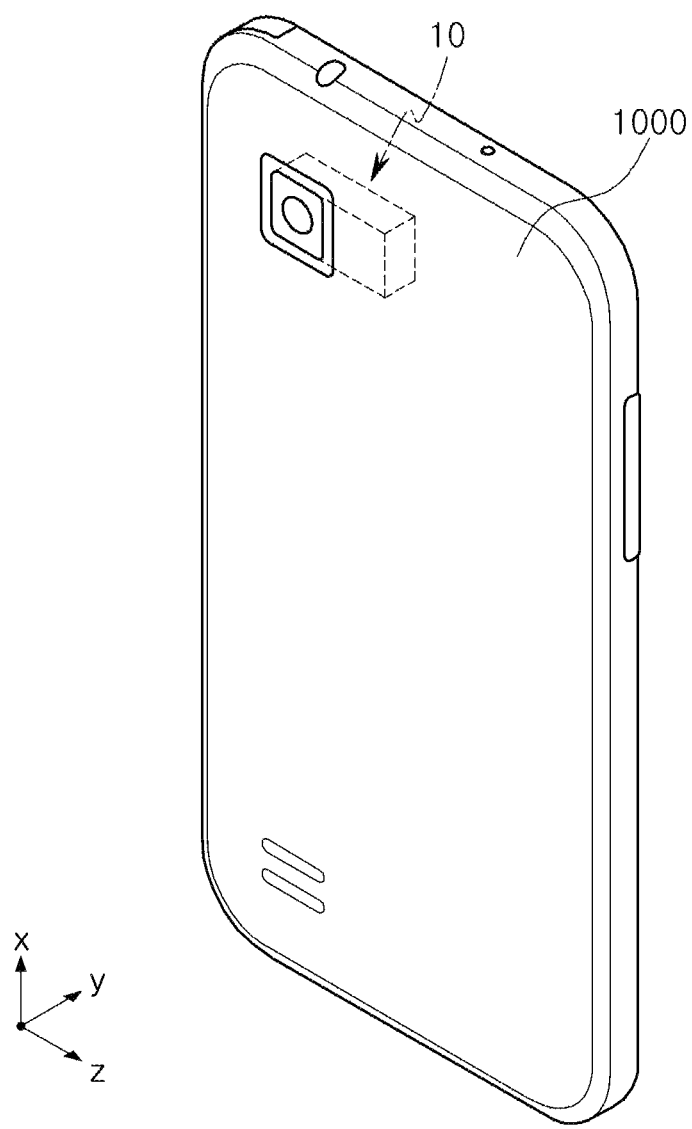
FIG. 1 is a perspective view of a portable electronic device according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of the disclosure of this application. For example, the sequences of operations described herein are merely examples, and are not limited to those set forth herein, but may be changed, as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. As used herein, the term "and/or" includes any one and any combination of any two or more of the associated listed items; likewise, "at least one of" includes any one and any combination of any two or more of the associated listed items. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The use of the term "may" with respect to an example or embodiment, for example, as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower," relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The features of the examples described herein may be combined in various ways as will be apparent after an understanding of the disclosure of this application. Further, although the examples described herein have a variety of configurations, other configurations are possible as will be apparent after an understanding of the disclosure of this application.

Due to manufacturing techniques and/or tolerances, variations of the shapes shown in the drawings may occur. Thus, the examples described herein are not limited to the specific shapes shown in the drawings, but include changes in shape that occur during manufacturing.

An aspect of the present disclosure is to provide a camera module having an optical zooming function and may be readily mounted in a portable electronic device.

FIG. 1 is a perspective view of a portable electronic device according to one or more examples.

Referring to FIG. 1, a portable electronic device 1000 may be a mobile communications terminal, a smartphone, a tablet PC, a wearable device, a vehicle, or the like in which a camera module 10 is mounted.

As illustrated in FIG. 1, the portable electronic device 1000 may be provided with the camera module 10 to capture an image of a subject. The camera module 10 includes a plurality of lens parts.

In the present example, the camera module 10 is disposed in such a manner that an optical axis (Z axis) of the plurality of lens parts is directed in a thickness direction (a Y-axis direction; a direction toward a rear surface from a front surface of the portable electronic device 1000, or an opposite direction thereof).

As an example, the optical axis (Z-axis) of the plurality of lens parts provided in the camera module 10 may be formed in a width direction or a length direction of the portable electronic device 1000.

Accordingly, even when the camera module 10 has functions such as autofocusing (hereinafter referred to as "AF"), optical zooming (hereinafter referred to as "zooming"), and optical image stabilization (hereinafter referred to as "OIS") functions, a thickness of the device 1000 may be prevented from increasing. Thus, the portable electronic device 1000 may be miniaturized.

The camera module 10 according to an example may have at least one of AF, zooming, and OIS functions.

The camera module 10, having AF, zooming, and OIS functions, has a size larger than a size of a general camera module lacking AF, zooming, and OIS functions.

When the camera module 10 increases in size, the portable electronic device 1000, in which the camera module 10 is mounted, is affected. Accordingly, there is a limitation in miniaturizing the portable electronic device 1000.

For example, for the zooming function, the camera module needs a moving space of a plurality of lens parts to change a focal distance of the plurality of lens parts. Therefore, in the case in which an optical axis (Z-axis) of the plurality of lens parts is formed in a thickness direction of the portable electronic device 1000, a thickness of the portable electronic device 1000 is also increased. In the case in which the thickness of the portable electronic device is not increased, it is difficult to implement the zooming function because the moving space of the plurality of lens parts is not sufficient.

To implement the AF and OIS functions, an actuator should be mounted in a direction (an X-axis direction or a Y-axis direction) perpendicular to the optical axis direction (the Z-axis direction) or an optical axis (a Z-axis) to move a plurality of lens parts. When the optical axis (Z-axis) of the plurality of lens parts is formed in the thickness direction of the portable electronic device, the actuator should also be mounted in the thickness direction of the portable electronic device to move the plurality of lens parts. Accordingly, the thickness of the portable electronic device is increased.

However, since the camera module 10 according to an example is disposed in such a manner that the optical axis (Z-axis) of the plurality of lens parts is perpendicular to the thickness direction of the portable electronic device 1000, the camera module 10 having the AF, zooming, and OIS functions may be readily mounted in the portable electronic device 1000. Accordingly, the portable electronic device 1000 may be miniaturized.

Figure 2:
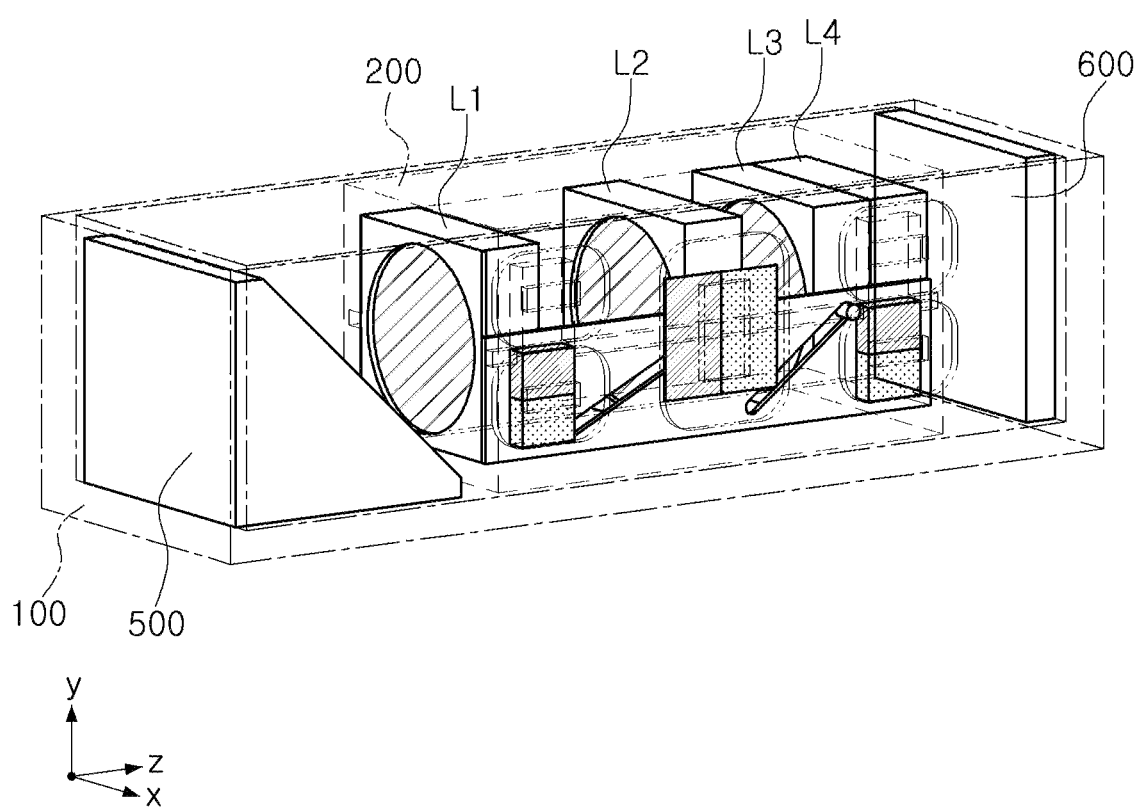
FIG. 2 is a perspective view of a camera module according to one or more examples.
Figure 3:
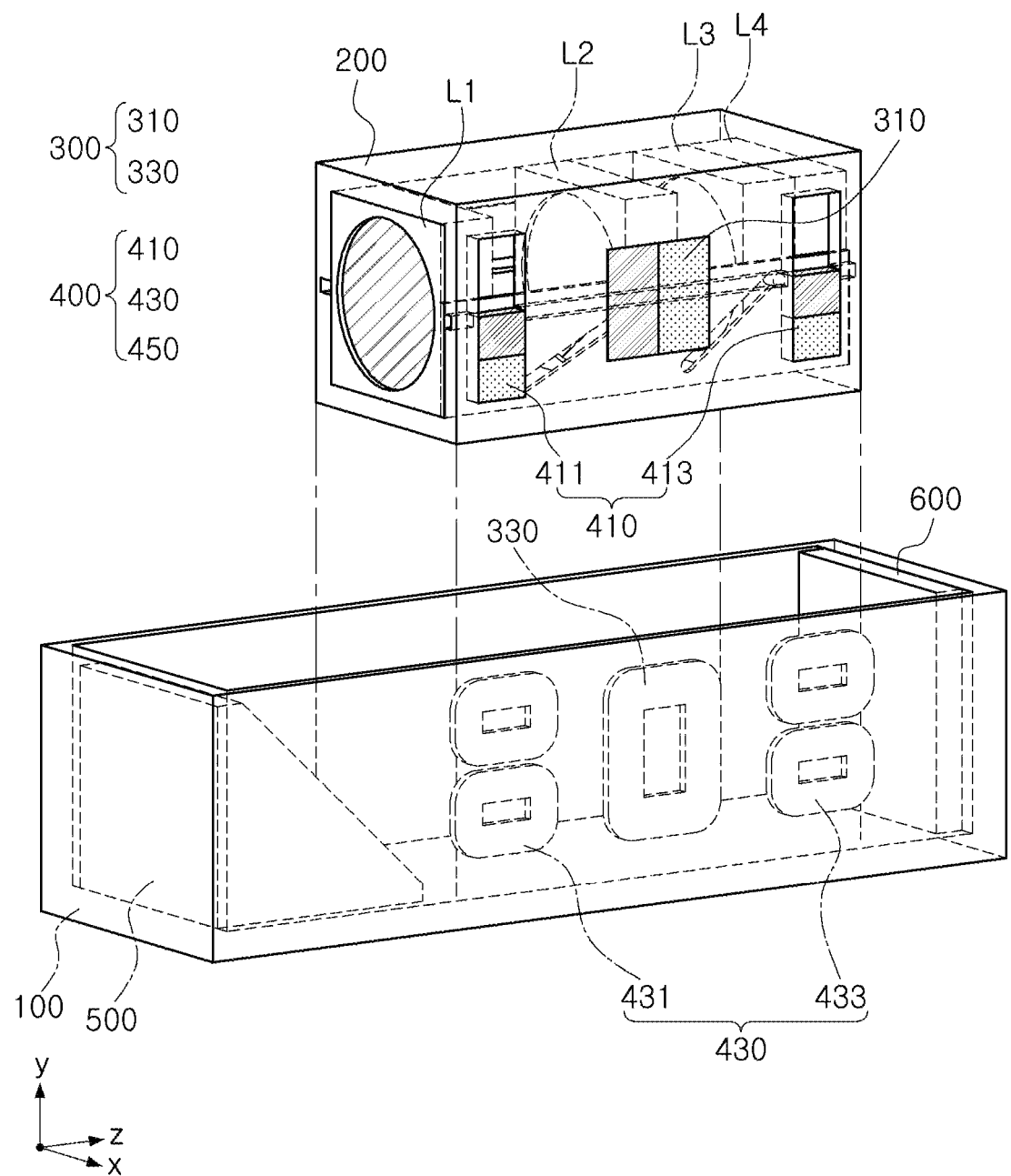
FIG. 3 is an exploded perspective view of a camera module according to one or more examples.

FIG. 2 is a perspective view of a camera module according to one or more examples, and FIG. 3 is an exploded perspective view of a camera module according to one or more examples.

Referring to FIGS. 2 and 3, a camera module 10 according to an example, includes a housing 100, a plurality of lens parts L1, L2, L3, and L4, a carrier 200, a first driving part 300, a second driving part 400, a reflection member 500, and a sensor part 600.

Each of the lens parts L1, L2, L3, and L4 may include a lens and a lens barrel accommodating the lens.

The reflection member 500 is disposed in front of the plurality of lens parts L1, L2, L3, and L4, and is configured to change a traveling direction of light. Accordingly, a path of light incident on the camera module 10 may be changed by the reflection member 500.

As an example, the light incident on the camera module 10 may be changed in the travelling direction to travel toward the plurality of lens parts L1, L2, L3, and L4 through the reflective member 500.

The reflection member 500 may be a mirror or a prism reflecting light.

The plurality of lens parts L1, L2, L3, and L4, the carrier 200, the first driving part 300, the second driving part 400, the reflection member 500, and the sensor part 600 are accommodated in the housing 100. However, the reflection member 500 may be disposed outside the housing 100.

The plurality of lens parts L1, L2, L3, and L4 are accommodated in the carrier 200, and the sensor part 600 is disposed in back of the carrier 200.

The sensor part 600 includes an image sensor and a printed circuit board (PCB) to convert light, passing through the plurality of lens parts L1, L2, L3, and L4, into an electrical signal.

The first driving part 300 is configured in such a manner that the carrier 200 is moved in the optical axis direction (Z-axis direction) to adjust a focus.

The first driving part 300 includes a first magnet 310 and a first coil 330 generating driving force to move the carrier 200 in the optical axis direction (the Z-axis direction).

The first magnet 310 is mounted on the carrier 200. As an example, the first magnet 310 may be mounted on one surface of the carrier 200. The first magnet 310 may have an N-pole and an S-pole in the optical axis direction (the Z-axis direction).

The first coil 330 is disposed to face the first magnet 310. A board (not shown) is mounted on an internal surface of the housing 100, and the first coil 330 is provided on the board.

The first magnet 310 is a movable member mounted on the carrier 200 to move together with the carrier 200, while the first coil 330 is a fixed member fixed to the housing 100.

When power is applied to the first coil 330, driving force is generated in the optical axis direction (the Z-axis direction) by electromagnetic influence between the first magnet 310 and the first coil 330. The carrier 200 may be moved in the optical axis direction (the Z-axis direction) by the driving force.

Since the plurality of lens parts L1, L2, L3, and L4 are accommodated in the carrier 200, the plurality of lens parts L1, L2, L3, and L4 are also moved in the optical axis direction (the Z-axis direction) by the movement of the carrier 200.

Although not illustrated in the drawings, a rolling member may be disposed between the carrier 200 and the housing 100 to reduce friction between the carrier 200 and the housing 100 when the carrier 200 is moved. The rolling member may have a ball shape.

Figure 4A:
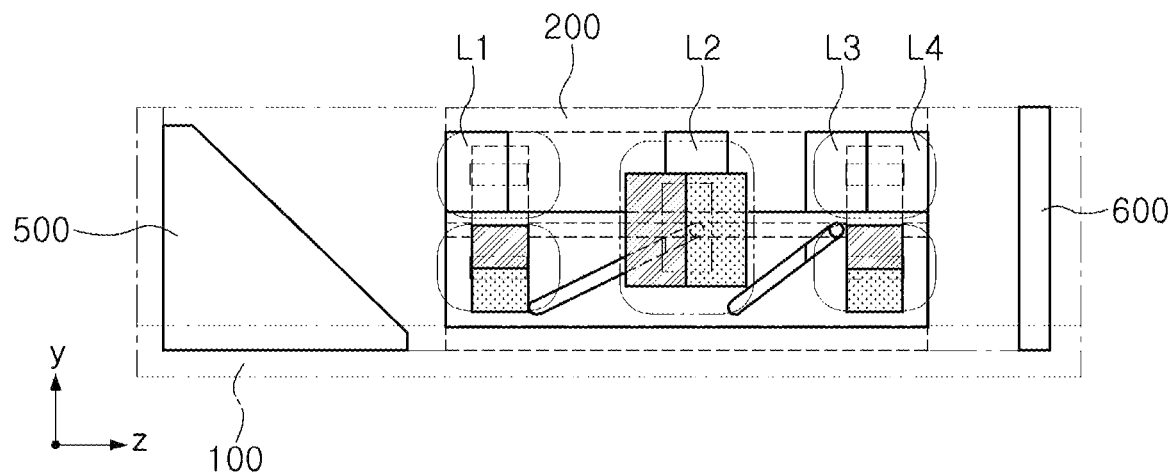
FIGS. 4A, 4B, and 4C are side views illustrating movement of a carrier according to one or more examples.
Figure 4B:
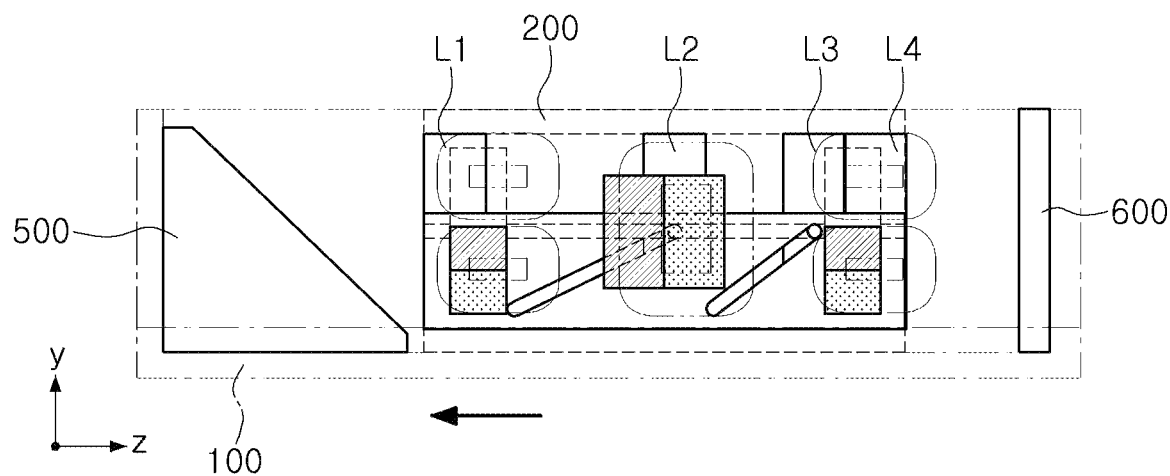
Figure 4C:
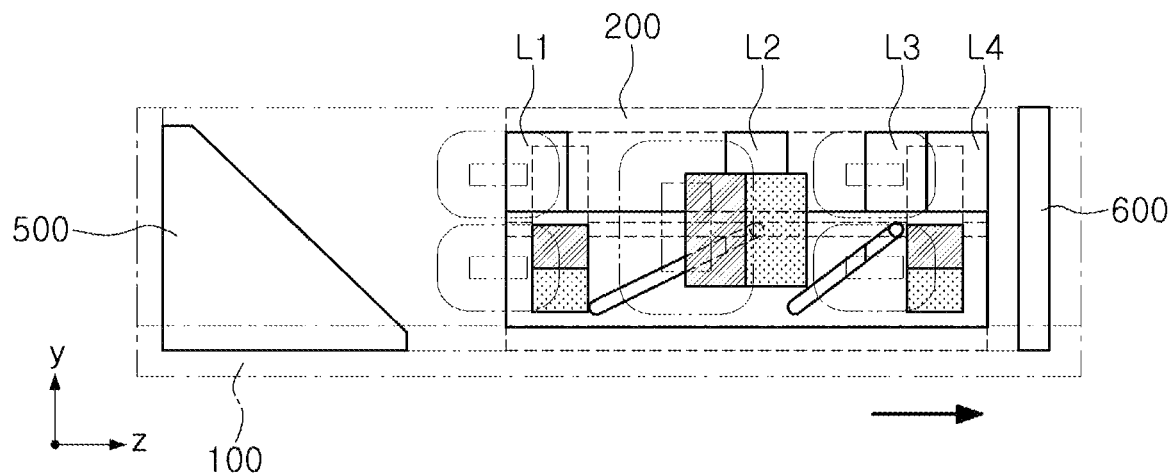

Referring to FIGS. 4A, 4B, and 4C, the carrier 200 is bidirectionally moved to one side and the other side of the optical axis direction (the Z-axis direction) in a stationary state by the first driving part 300 (see FIGS. 4B and 4C).

For optical zooming, the second driving part 400 is configured in such a manner that among the plurality of lens parts L1, L2, L3, and L4, some lens parts L2 and L3 are moved relative to the carrier 200 in the optical axis direction (the Z-axis direction).

Among the plurality of lens parts L1, L2, L3 and L4, for example, some lens parts L2 and L3 are configured in such a manner that they are moved relative to the carrier 200 by the second driving part 400. Among the plurality of lens parts L1, L2, L3, and L4, the remaining lens parts L1 and L4 4 are fixed to the carrier 200.

In the present example, some lens parts L2 and L3 have been described as being moved. However, one or more lens parts may be moved relative to the carrier 200, as long as the entire focal length of the plurality of lens parts L1, L2, L3, and L4 may be changed for optical zooming.

Figure 5:
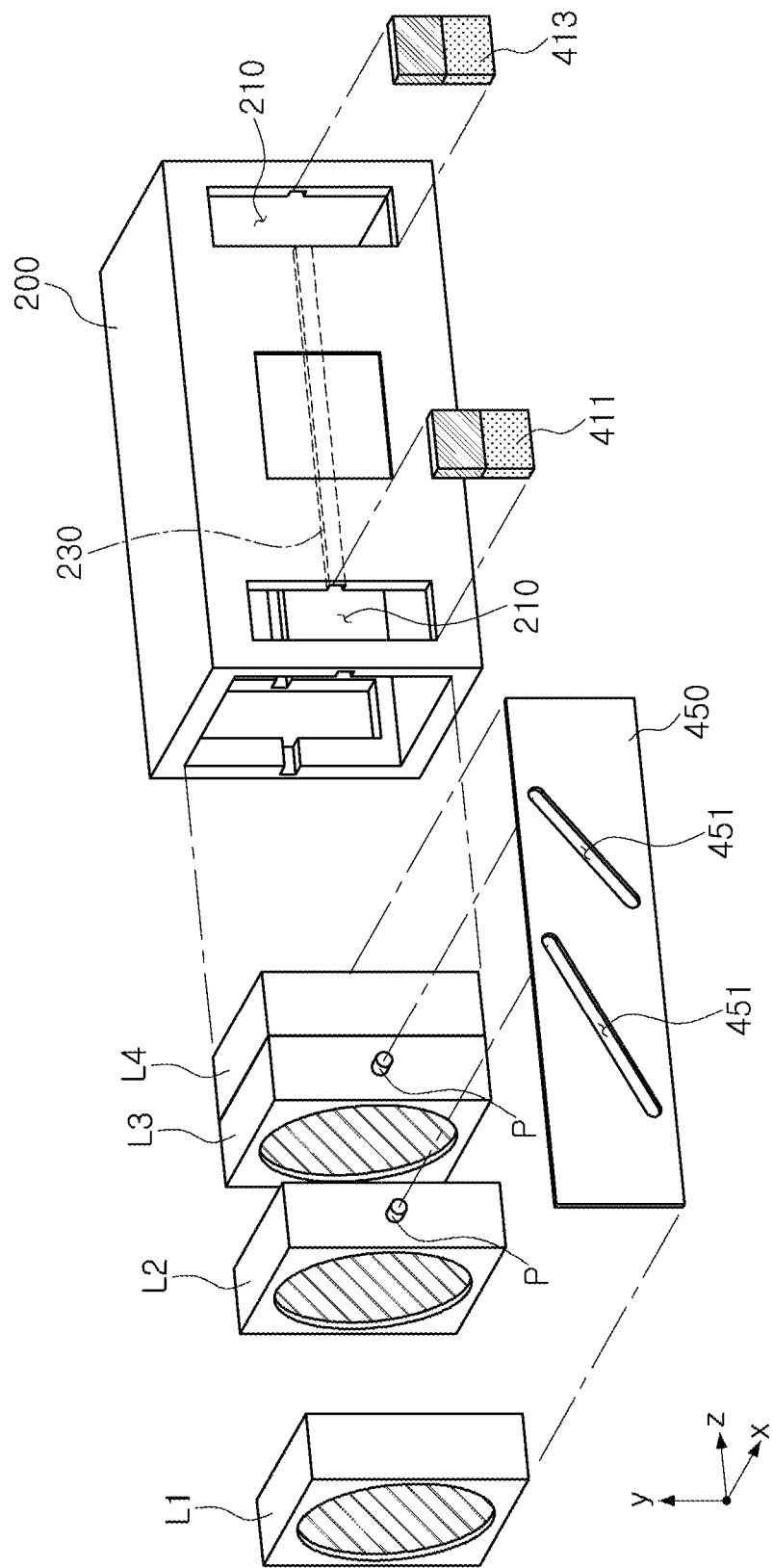
FIG. 5 is a perspective view of a plurality of lens parts, a carrier, and a guide member according to one or more examples.
Figure 6:
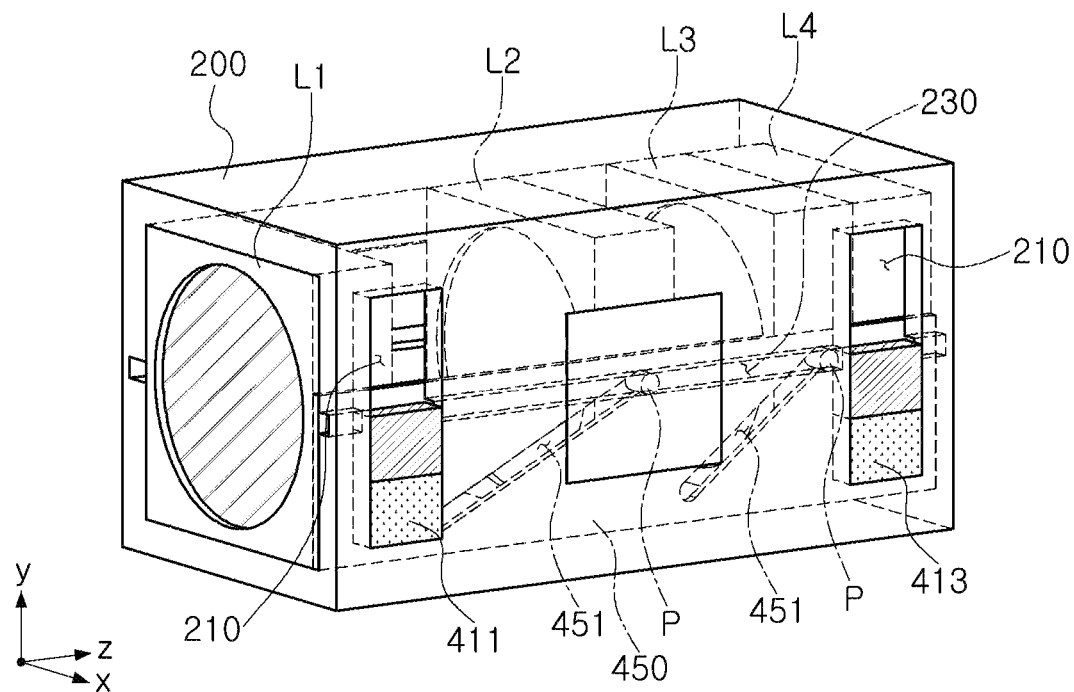
FIG. 6 is a perspective view illustrating a structure in which a plurality of lens parts, a carrier, and a guide member are coupled to each other according to one or more examples.

FIG. 5 is a perspective view of a plurality of lens parts, a carrier, and a guide member, and FIG. 6 is a perspective view illustrating a structure in which the plurality of lens parts, the carrier, and the guide member are coupled to each other according to one or more examples.

Figure 7A:
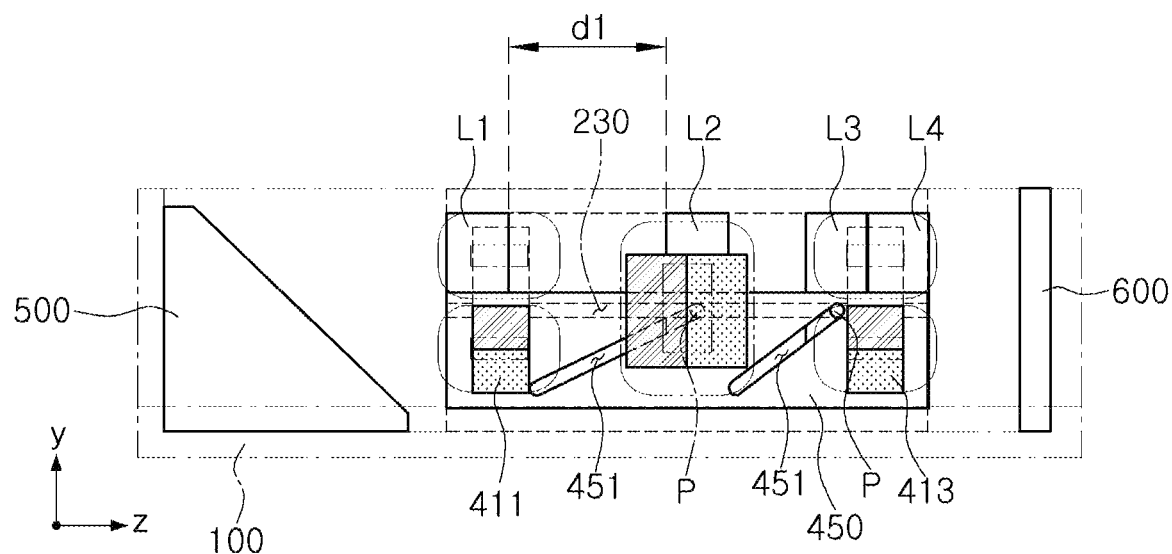
FIGS. 7A, 7B, and 7C are side views illustrating movement of some lens parts among a plurality of lens parts according to one or more examples.
Figure 7B:
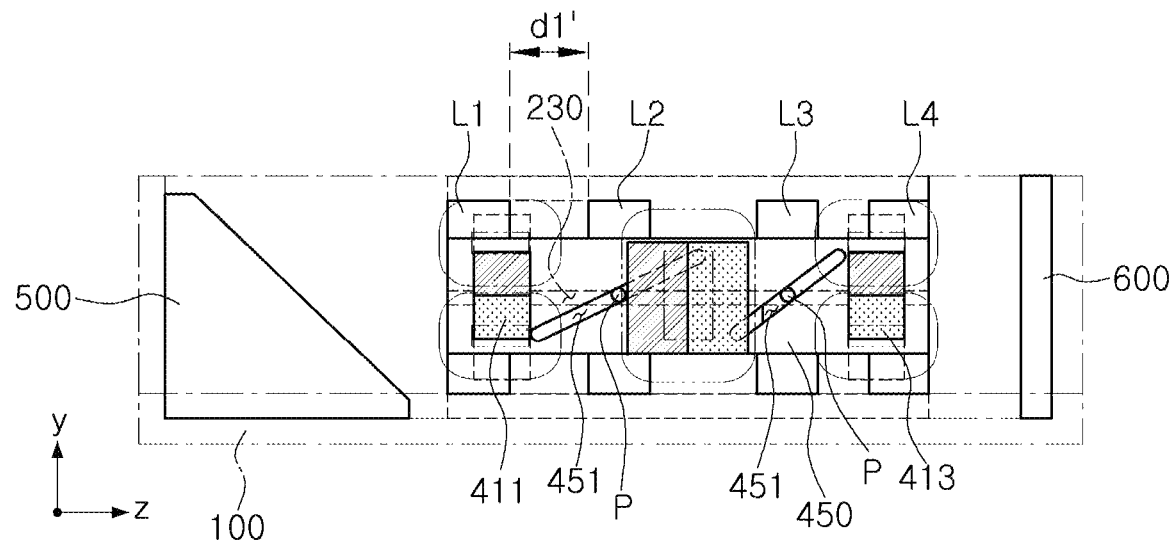
Figure 7C:
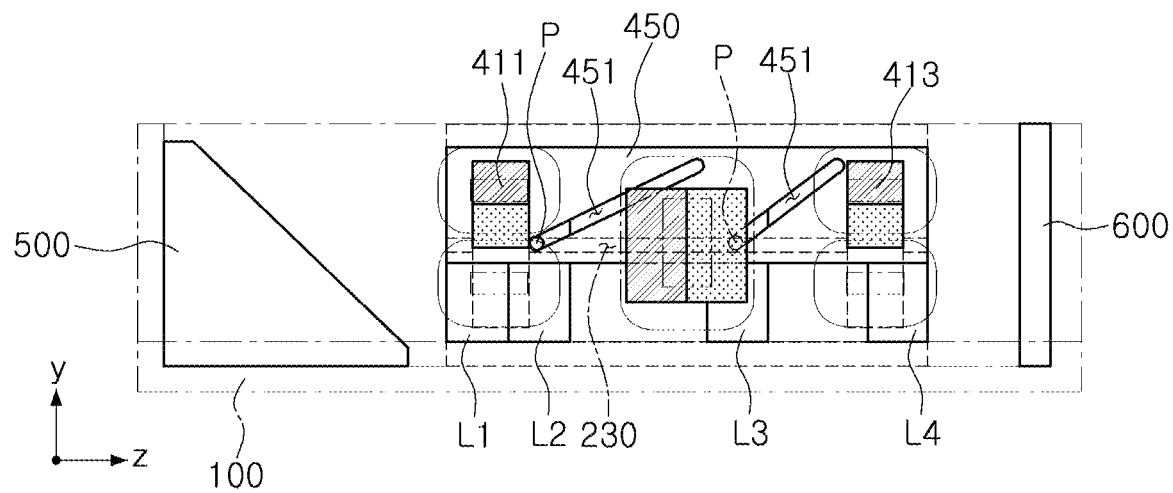

FIGS. 7A, 7B, and 7C are side views illustrating movement of some lens parts among a plurality of lens parts according to one or more examples.

Referring to FIGS. 3, 5 and 6, the second driving part 400 includes a guide member 450, a second magnet 410, and a second coil 430.

The second driving part 400 includes a second magnet 410 and a second coil 430 generating driving force to move some lens parts L2 and L3. The second driving part 400 further includes a guide member 450 configured to guide movement of some lens parts L2 and L3.

The guide member 450 is disposed between the plurality of lens parts L1, L2, L3, and L4 and the carrier 200. For example, the guide member 450 is accommodated in the carrier 200.

The second magnet 410 is mounted on the guide member 450. As an example, the second magnet 410 may be mounted on one surface of the guide member 450. The second magnet 410 may have an N-pole and an S-pole in a direction (a Y-axis direction) perpendicular to the optical axis (the Z-axis). The carrier 200 is provided with a mounting hole 210 exposing a portion of the guide member 450, and the second magnet 410 is mounted on the guide member 450 through the mounting hole 210.

The second coil 430 is disposed to face the second magnet 410. A board (not shown) is mounted on an internal surface of the housing 100, and a second coil 430 is provided on the board.

The second magnet 410 is a movable member mounted on the guide member 450 to move together with the guide member 450, and the second coil 430 is a fixed member fixed to the housing 100.

The second magnet 410 may include magnets 411 and 413, respectively provided on both sides on the basis of the first magnet 310, and the second coil 430 may include four coils 431 and 433 of two coils each, respectively provided on both sides on the basis of the first coil 330. The two coils 431 disposed on one side may be disposed in the direction (the Y-axis direction) perpendicular to the optical axis (the Z-axis), and the two coils 433 disposed on the other side of the guide member 450 may also be disposed in the direction (Y-axis direction) perpendicular to the optical axis (the Z-axis).

When power is applied to the second coil 430, driving force is generated in the direction (Y-axis direction) perpendicular to the optical axis (Z-axis) by an electromagnetic influence between the second magnet 410 and the second coil 430, and the guide member 450 may be moved in the direction (the Y-axis direction) perpendicular to the optical axis (the Z-axis) by the driving force.

Some lens parts L2 and L3 of the plurality of lens parts L1, L2, L3, and L4 are configured to move in the optical axis direction (the Z-axis direction) according to the movement of the guide member 450. For example, a direction, in which the guide member 450 moves, and a direction, in which some lens parts L2 and L3 move, are different from each other.

Each of the lens parts L2 and L3 that move by movement of the guide member 450 is provided with a protrusion P, the guide member 450 is provided with a guide hole 451, and the carrier 200 is provided with a guide groove 230. The guide groove 230 may also be provided on the carrier 200 in the form of a hole.

The protrusion P is disposed to penetrate the guide hole 451, and is disposed to be inserted into the guide groove 230.

The guide hole 451 is provided in a form inclined to the optical axis direction (the Z-axis direction), and the guide groove 230 is provided in a form extending in the optical axis direction (the Z-axis direction).

The number of the guide holes 451 corresponds to the number of protrusions P provided in the lens parts L2 and L3. When a plurality of guide holes 451 are provided, angles of inclination of the guide holes 451 may be different from each other.

Each of the lens parts L2 and L3 may include a lens and a lens barrel accommodating the lens. In this case, the protrusion P may be provided on the lens barrel.

Referring to FIGS. 7A, 7B, and 7C, some lens parts L2 and L3 are moved in the optical axis direction (the Z-axis direction) by the second driving part 400 (see FIGS. 7B and 7C) in a stationary state (see FIG. 7A).

The guide member 450 is moved in the direction (the Y-axis direction) perpendicular to the optical axis (the Z-axis) by the driving force generated by the second magnet 410 and the second coil 430. As the guide member 450 is moved, protrusions P formed on some lens parts L2 and L3 are moved in guide holes 451 formed in the guide member 450 and the guide grooves 230 formed in the carrier 200.

For example, since the protrusion P is moved in the optical axis direction (the Z-axis direction) along the guide hole 451 and the guide groove 230, some lens parts L2 and L3 may be relatively moved in the optical axis direction (the Z-axis direction).

Accordingly, the entire focal length of the plurality of lens parts L1, L2, L3, and L4 may be changed as some lens parts L2 and L3 are moved by the second driving part 400. As a result, an optical zooming function may be implemented.

Since some lens parts L2 and L3 are moved in the optical axis direction (the Z-axis direction), a relative distance between some lens parts L2 and L3 and the remaining lens parts L1 and L4 changes, for example, a relative distance between L1 and L2 changes from d1 to d1' (d1→d1').

Also, the relative distance between some lens parts L2 and L3 may change. For example, the distance between L2 and L3 may change. For example, a distance between L1 and L3 may change by the same amount as the change from d1→d1', by more than the change from d1→d1', or less than the change from d1→d1' depending on the relative inclination of the guide holes 451 to each other.

Figure 8A:
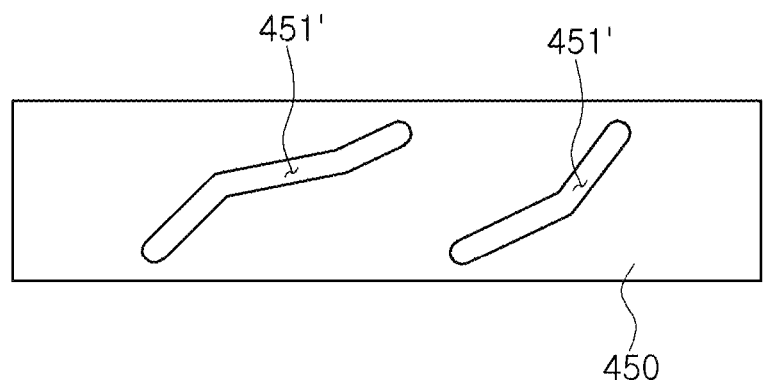
FIGS. 8A and 8B illustrate a modified example of a guide member according to one or more examples.
Figure 8B:
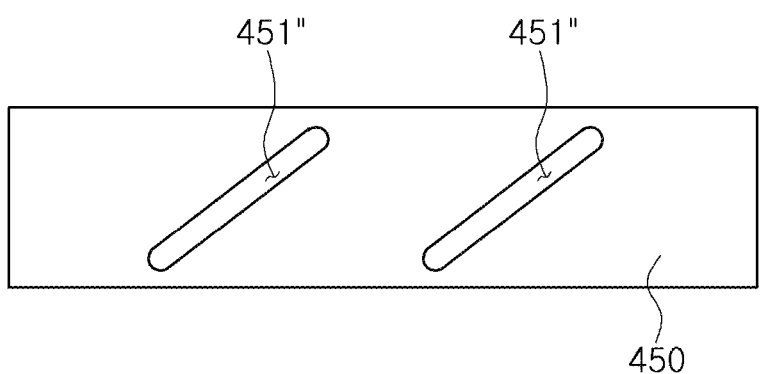

FIGS. 8A and 8B illustrate a modified example of a guide member.

Referring to FIG. 8A, a guide hole 451' of a guide member 450 may have a shape in which a plurality of holes having different angles of inclination are connected to each other.

Referring to FIG. 8B, in the case of a plurality of guide holes 451", they have the same angle of inclination.

Figure 9:
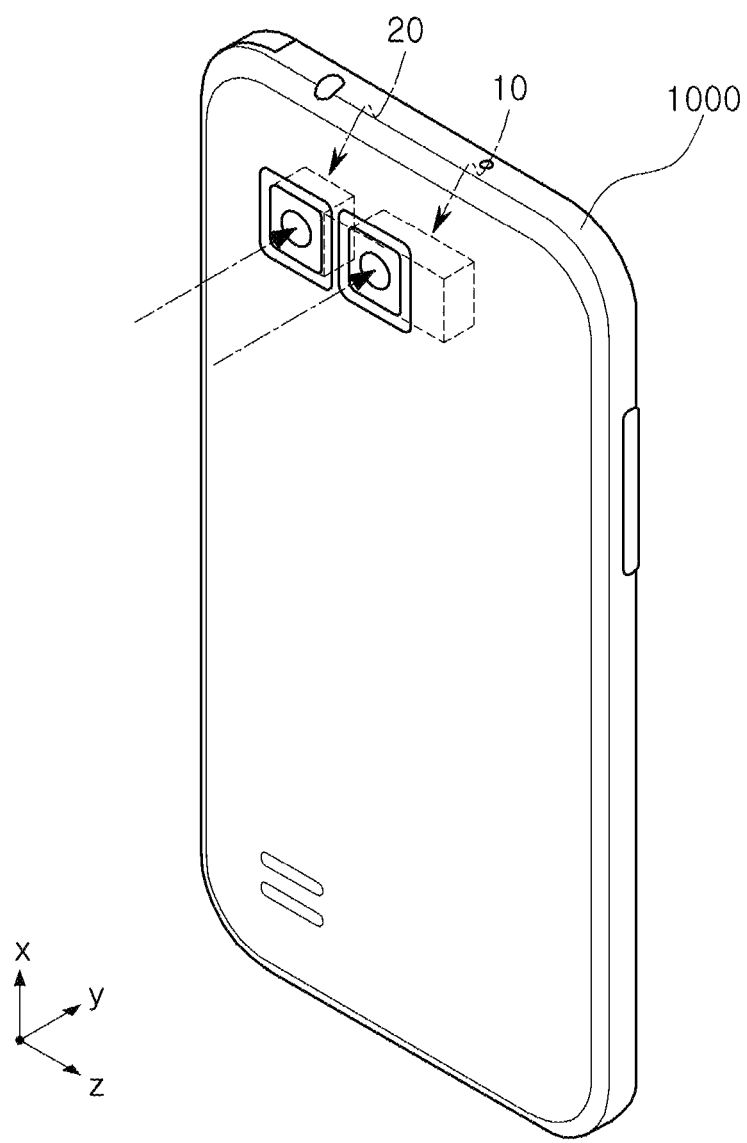
FIG. 9 is a perspective view of a portable electronic device according to one or more other examples.

FIG. 9 is a perspective view of a portable electronic device according to one or more other examples.

Referring to FIG. 9, a portable electronic device 1000 according to an example may be a mobile communications terminal, a smartphone, a tablet PC, a wearable device, a vehicle, or the like in which a plurality of camera modules 10 and 20 are mounted.

In the present example, a plurality of camera modules 10 and 20 are mounted in the portable electronic device 1000.

The plurality of camera modules 10 and 20 includes a first camera module 10 and a second camera module 20. As described with reference to FIGS. 2 to 8B, the first camera module 10 is disposed in such a manner that an optical axis (a Z-axis) is perpendicular to a thickness direction of the portable electronic device 1000 (a Y-axis direction; a direction toward a rear surface from a front surface of the portable electronic device 1000, or an opposite direction thereof).

The camera module 10 may change a focal length to implement an optical zooming function.

The second camera module 20 is disposed in such a manner that the optical axis (a Y-axis) is directed in a thickness direction of the portable electronic device 1000 (the Y-axis direction; a direction toward a rear surface from a front surface of the portable electronic device 100, or an opposite direction thereof).

The second camera module 20 may include a fixed focus lens whose focal distance is not changed, and the focal distance of the fixed focus lens may be relatively short. For example, the second camera module 20 may include a wide-angle lens.

The optical axis (the Z-axis) of the first camera module 10 and the optical axis (the Y-axis) of the second camera module 20 may be disposed perpendicular to each other.

As described above, the first camera module 10 having the optical zoom function and the second camera module 20 having the wide-angle lens may be provided to capture an image of a subject at various depths of field.

The portable electronic device 1000 may further include a display unit 1020, wherein the first camera module 10 is installed as a front camera of the portable electronic device 1000 along with the display unit 1020 or as a back camera on a side of the portable electronic device 1000 other than a side with the display unit 1020. As described in the various examples, light converted by sensor parts, for example sensor part 600 of the first camera module 10 (FIG. 2) and another sensor part of the second camera module 20, converted into an electrical signal may be output as an image via the display unit 1020 of the portable electronic device 1000.

Through the above-described examples, a camera module according to one or more examples may be readily mounted on a portable electronic device and may implement an optical zooming function.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a carrier accommodating lenses;
   a housing accommodating the carrier;
   a first driving part configured to move the carrier in an optical axis direction; and
   a second driving part configured to move at least one lens of the lenses relative to the carrier in the optical axis direction, parallel or antiparallel to the direction the carrier is configured to be moved.

2. The camera module of claim 1, wherein the first driving part comprises a first magnet disposed on the carrier, and a first coil disposed to face the first magnet.

3. The camera module of claim 1, wherein the second driving part comprises:
   a guide member disposed between the lenses and the carrier;
   a second magnet disposed on the guide member; and
   a second coil disposed to face the second magnet.

4. The camera module of claim 3, wherein the guide member and the at least one lens are moved in different directions by driving force generated by the second magnet and the second coil.

5. The camera module of claim 3, wherein the second magnet and the second coil react to each other to generate driving force in a direction perpendicular to the optical axis direction.

6. The camera module of claim 5, wherein the guide member is moved in a direction perpendicular to the optical axis direction by the driving force, and
   the at least one lens is moved in the optical axis direction according to movement of the guide member.

7. The camera module of claim 3, wherein the carrier comprises a mounting hole exposing a portion of the guide member, and the second magnet is disposed on the exposed portion of the guide member.

8. The camera module of claim 3, further comprising: a lens barrel accommodating the at least one lens,
wherein the lens barrel comprises a protrusion,
wherein the guide member comprises a guide hole through which the protrusion penetrates, and
wherein the carrier comprises a guide groove in which the protrusion is disposed.

9. The camera module of claim 8, wherein the guide hole comprises a shape inclined to the optical axis direction.

10. The camera module of claim 8, wherein the guide groove comprises a shape extending in the optical axis direction.

11. The camera module of claim 1, wherein the at least one lens is moved relative to the carrier by the second driving part, and
wherein at least one other lens of the lenses is fixed to the carrier.

12. The camera module of claim 1, further comprising:
a reflection member, disposed in front of the lenses, changing a path of light.

13. A portable electronic device, comprising:
the camera module of claim 1 further comprising a sensor part disposed in the housing, configured to convert light incident through the lenses to an electric signal; and
a display unit disposed on a surface of the portable electronic device to display an image based on the electric signal.

14. A camera module comprising:
a carrier accommodating lens parts;
a reflection member, disposed in front of the lens parts, changing a path of light;
a housing accommodating the carrier;
a first driving part configured to move the carrier in an optical axis direction; and
a second driving part configured to move at least one lens part of the lens parts in the optical axis direction, parallel or antiparallel to the direction the carrier is configured to be moved, relative to another lens part of the lens parts.

15. The camera module of claim 14, wherein the second driving part comprises:
a guide member disposed between the lens parts and the carrier;
a magnet mounted on the guide member; and
a coil disposed to face the magnet.

16. The camera module of claim 15, wherein the guide member is moved in a direction perpendicular to the optical axis direction by the magnet and the coil, and
the at least one lens part is configured to be moved in the optical axis direction according to movement of the guide member.

17. The camera module of claim 14, wherein the other lens part is fixed to the carrier.

18. The camera module of claim 14, wherein the other lens part comprises a fixed lens part fixed to the carrier and a movable lens part, wherein the movable lens part is moved relative to the fixed lens part when the second driving part moves the at least one lens part.

19. A portable electronic device, comprising:
the camera module of claim 14 further comprising a sensor part disposed in the housing, configured to convert light incident through the lens parts to an electric signal; and
a display unit disposed on a surface of the portable electronic device to display an image based on the electric signal.

20. A camera module comprising:
a carrier accommodating lens parts disposed along an optical axis, the carrier comprising slots inclined to the optical axis movable in a direction substantially perpendicular to the optical axis,
wherein a first portion of the lens parts is fixed to the carrier and a second portion of the lens parts is slidably disposed in the slots to move in the optical axis direction, parallel or antiparallel to the direction the carrier is movable, relative to the first portion when the slots move in the direction substantially perpendicular to the optical axis.

* * * * *